United States Patent
Chen

(10) Patent No.: US 10,735,127 B1
(45) Date of Patent: Aug. 4, 2020

(54) WAVELENGTH DIVISION MULTIPLEXING (WDM) BASED PHOTONIC RADAR WITH OPTICAL SIGNAL PROCESSING

(71) Applicant: Rockwell Collins, Inc., Cedar Rapids, IA (US)

(72) Inventor: Wenlu Chen, Clarksville, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/561,416

(22) Filed: Sep. 5, 2019

(51) Int. Cl.
*H04J 14/02* (2006.01)
*H01Q 3/26* (2006.01)
*G01S 13/58* (2006.01)

(52) U.S. Cl.
CPC ........ *H04J 14/0215* (2013.01); *G01S 13/587* (2013.01); *H01Q 3/2676* (2013.01); *H04J 14/0223* (2013.01)

(58) Field of Classification Search
None
See application file for complete search history.

(56) References Cited

U.S. PATENT DOCUMENTS

| | | | | |
|---|---|---|---|---|
| 4,317,214 A | * | 2/1982 | Attinello | H04B 17/0085 455/1 |
| 5,977,911 A | * | 11/1999 | Green | H01Q 3/22 342/157 |
| 7,245,833 B1 | * | 7/2007 | Volkening | H04B 10/2575 398/116 |
| 2005/0094928 A1 | * | 5/2005 | Ng | G02B 6/12019 385/15 |
| 2005/0156778 A1 | * | 7/2005 | Yap | G01S 7/28 342/54 |
| 2007/0206958 A1 | * | 9/2007 | Chen | H01Q 3/2676 398/183 |
| 2010/0028012 A1 | * | 2/2010 | Ng | H04B 10/2575 398/116 |
| 2013/0315597 A1 | * | 11/2013 | Shaver | H04J 14/0227 398/79 |

FOREIGN PATENT DOCUMENTS

CN          104297731 A    *   1/2015

* cited by examiner

*Primary Examiner* — David W Lambert
(74) *Attorney, Agent, or Firm* — Suiter Swantz pc llo

(57) ABSTRACT

A wavelength division multiplexing (WDM)-based photonic radar architecture is disclosed. The WDM-based photonic radar incorporates a WDM photonic input of N component wavelengths modulated by an IF-LFM input signal and its 90-degree phased counterpart. The modulated WDM photonic signal is split one branch sent to a photodetector for generation of an RF outbound signal and transmission of the signal, which is reflected by a target and received as an RF echo signal after a time delay. The other branch has each component wavelength time-adjusted by a second time delay for each wavelength. The resulting time-delayed WDM photonic signal is modulated again based on the received RF echo signal and split into wavelength selective channels. Filters in each channel extract two adjacent photonic signals converted to RF output signals by photodetectors. RF filters select a single RF signal for processing based on the closest difference between the two time delays.

13 Claims, 5 Drawing Sheets

*FIG. 3A*

| 312 | Transmitting the outbound RF signal via at least one antenna element |

| 314 | Receiving, via the antenna element, at least one RF echo signal corresponding to the transmitted outbound RF signal and reflected by at least one target, the RF echo signal associated with a first time delay corresponding to the reflection |

| 316 | Time-adjusting each component wavelength of the reference branch according to an array of second time delays corresponding to the plurality of component wavelengths |

| 318 | Modulating, via an optical phase modulator, the time-adjusted reference branch based on the received RF echo signal |

| 320 | Demultiplexing the modulated time-adjusted reference branch into a plurality of wavelength-selective output channels |

*FIG. 3B*

WAVELENGTH DIVISION MULTIPLEXING (WDM) BASED PHOTONIC RADAR WITH OPTICAL SIGNAL PROCESSING

TECHNICAL FIELD

The subject matter disclosed herein is related generally to surveillance systems and particularly to photonics-based surveillance radar systems.

BACKGROUND

Real-time, long-range, high-resolution radar can be highly valuable for both military and civilian applications. A photonics-based radar with broadband signal generation and processing has been proposed, using a linear frequency modulated (LFM) signal to achieve high performance. However, the effectiveness of this solution is limited by the bandwidth of the LFM signal.

SUMMARY

A wavelength division multiplexing (WDM) based photonic radar architecture is disclosed. In embodiments, the WDM-based photonic radar includes a laser emitter or similar source for generating a set of N component wavelengths combined or multiplexed into a WDM-based photonic input. The WDM-based photonic radar includes a radio frequency (RF) hybrid coupler for receiving a linear frequency modulated (LFM) signal in the intermediate frequency (IF) band and outputting both the IF-LFM signal and a counterpart signal 90 degrees out of phase. The IF-LFM signal and its phased counterpart drive a dual-parallel Mach-Zehnder modulator (MZM) for modulating the photonic WDM input. The modulated WDM photonic input is split into two branches, each branch comprising an equivalent signal sent respectively to an antenna element and a reference arm of the WDM-based photonic radar. Within the antenna element, optical filters select a component wavelength for conversion (via photodiode/photodetector) into an outbound RF signal. The outbound RF signal is transmitted via transmitter elements and reflected by a target, resulting in a time-delayed RF echo signal received by receiver elements of the antenna. Within the reference branch, each of the N component wavelengths is time-delayed according to an array of N wavelength selective time delays and multiplexed back into a time-delayed reference branch. An optical phase modulated modulates the time-delayed reference branch according to the received RF echo signal. The WDM-based photonic radar includes an array of N output channels wherein the modulated time-adjusted reference branch is demultiplexed into its N component wavelengths. Each component wavelength is optically filtered to extract two frequency-adjacent photonic signals, from which an RF output signal is generated via photodetector conversion. Each of the N RF output signals is electrically filtered to pass only the RF output signal having a time-adjusted delay closest to the natural delay associated with the transmission of the outbound RF signal and the reception of the RF echo signal. The passed RF output signal is further processed to derive distance information of the target.

A method for WDM-based photonic radar ranging is also disclosed. In embodiments, the method includes generating a WDM-based photonic input comprising a set of N component wavelengths. The method includes generating, via RF hybrid coupler, a phased RF signal (e.g., 90° out of phase) based on a received IF-LFM signal. The method includes modulating the WDM-based photonic input according to the IF-LFM signal and the phased RF signal (e.g., via dual-parallel MZM or similar electro-optical modulator (EOM)). The method includes splitting the modulated WDM photonic input into a reference branch and an antenna branch. The method includes generating, via photodetector/photodiode, an outbound RF signal based on a selected component wavelength of the antenna branch. The method includes transmitting the outbound RF signal via an antenna element. The method includes receiving after a time delay, via antenna element, an RF echo signal based on a reflection of the outbound RF signal by a target (the time delay based on the transmission and reflection of the signal). The method includes time-adjusting each of the N component wavelengths of the reference branch based on an array of N time delays. The method includes modulating, via optical phase modulator, the time-adjusted reference branch based on the received RF echo signal. The method includes demultiplexing the modulated time-adjusted reference branch into an array of N wavelength selective output channels, each channel corresponding to a component wavelength. The method includes, within each output channel, extracting two adjacent-frequency photonic signals from each component frequency. The method includes, within each output channel, converting the adjacent-frequency photonic signals into an RF output signal via photodetector. The method includes, within each output channel, selecting a final RF output signal by electrically filtering out every RF output signal apart from the RF output signal having the adjusted time delay closest to the time delay associated with the transmission, reflection, and reception of the RF echo signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 3A through 3C are flow diagrams illustrating a method for WDM-based photonic radar ranging in accordance with example embodiments of this disclosure.

DETAILED DESCRIPTION

Figure 1:
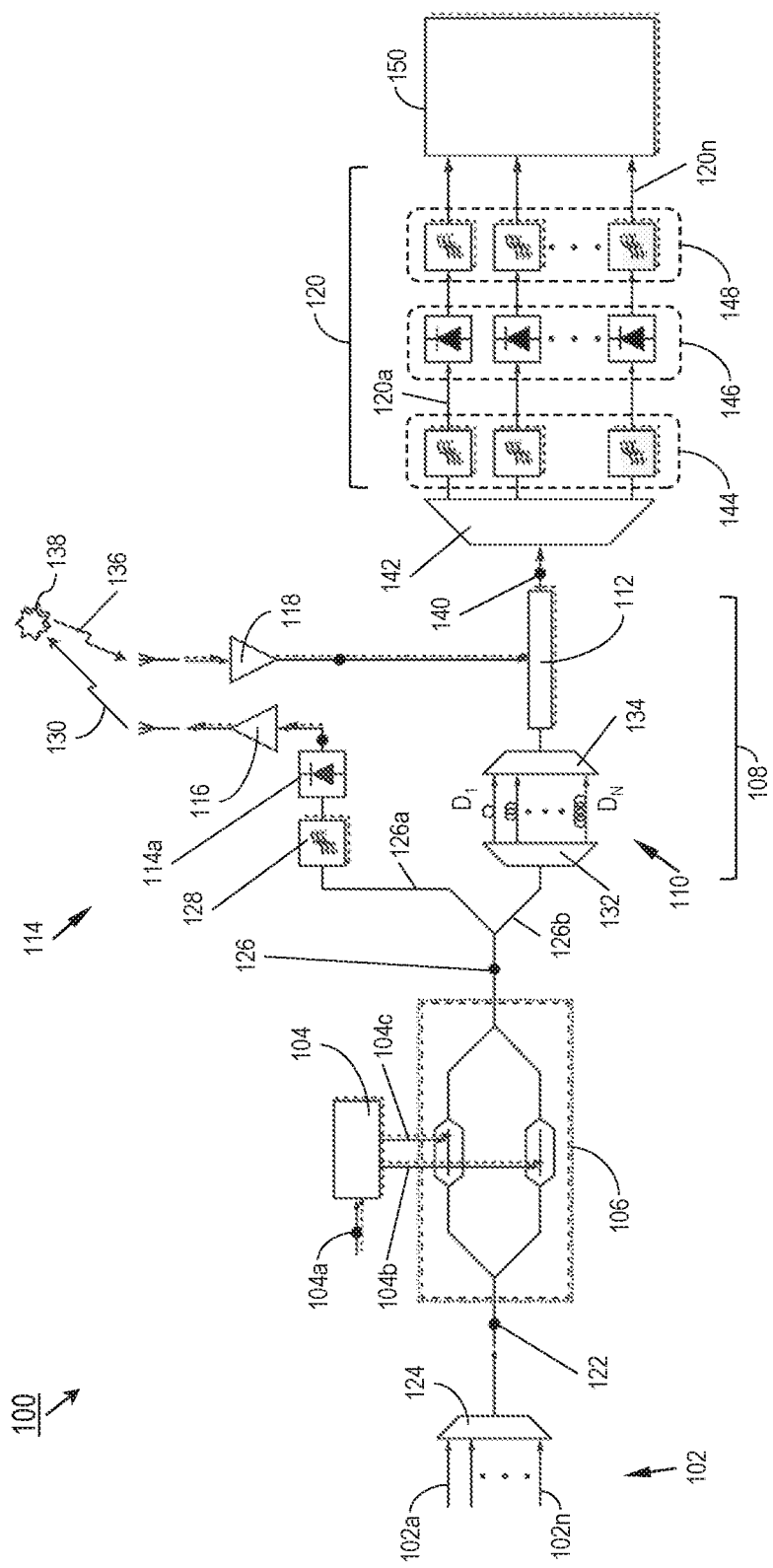
FIG. 1 is a diagrammatic illustration of a wavelength division multiplexing (WDM)-based photonic radar architecture in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a wavelength division multiplexing (WDM) based photonic radar architecture 100 is disclosed. (Throughout this disclosure, the terms "photonic" and "optical" may be used interchangeably.) In embodiments, the WDM-based photonic radar 100 may include a photonic input source 102, RF hybrid coupler 104, electro-optical modulator (EOM) 106, reference arm 108 (including optical delay lines 110 and optical phase modulator 112), antenna element 114 (including photodetectors 114a, transmitter element 116, and receiver element 118), and a set of wavelength-selective physical channels 120. The WDM-based photonic radar 100 may additionally include filters or amplifiers positioned within the optical path connecting the components of the WDM-based photonic radar to prevent or alleviate signal loss.

In embodiments, the WDM-based photonic radar 100 may receive a photonic input 122 generated by the photonic input source 102, which may be a distributed feedback laser (DFL) or any similarly appropriate continuous-wave (CW) or pulsed laser source. The photonic input 122 may be a wavelength division multiplexed (WDM) input combining a set of N component wavelengths (102a ... 102n) and having an initial frequency N0 [for i=1, 2, ... N]. The N component wavelengths 102a-n may be combined, via arrayed waveguide grating 124 (AWG) or any other appropriate multi-wavelength optical combiner, into a single WDM photonic input 122.

In embodiments, the RF hybrid coupler 104 may be a 90-degree hybrid coupler capable of receiving an intermediate-frequency (IF-band) linear frequency modulated (LFM) input signal (104a), having a frequency $f_{IF}=f_0+kt$ [for initial frequency $f_0$ and chirp rate k]. The RF hybrid coupler may split the IF-LFM input signal 104a into two LFM output signals (104b-c) having a 90-degree phase shift between them. The EOM 106 may be a dual-parallel Mach-Zehnder modulator (DP-MZM) driven by the LFM output signals 104b-c. The modulated photonic input 126 output by the EOM 106 may result in two second-order sideband signals $f_U$ and $f_L$ where $f_U=f_c(i)+2(f_0+kt)=f_c(i)-2 f_{IF}$ and $f_L=-2(f_0+kt)=f_c(i)+2 f_{IF}$.

In embodiments, the modulated photonic input 126 may be split into two equivalent branches 126a-b (e.g., via optical splitter), an antenna branch 126a and a reference branch 126b. For example, the antenna branch 126a may be passed to the antenna element 114, where optical bandpass filters 128 may select a component wavelength (of the N component wavelengths comprising the antenna branch 126a) for conversion to an outbound RF signal 130 by the photodetector 114a. The outbound RF signal 130, emitted by the transmitter element 116, may have an outbound frequency $f_{OUT}$, where $f_{OUT}=f_U-f_L=f_c(i)+2(f_0+kt)-[f_c(i)+2(f_0+kt)]=4(f_0+kt)]=4 f_{IF}$ (e.g., quadruple the frequency $f_{IF}$ of the IF-LFM input signal 104a).

In embodiments, the reference branch 126b may be (e.g., via wavelength selective AWG or optical demultiplexer 132) demultiplexed into its N component wavelengths $\lambda_1 \ldots \lambda_N$. Each component wavelength may be passed through an optical delayline (e.g., reference channel) of the array 110 and time-adjusted according to array of time delays $D_1, \ldots D_N$. The time-adjusted component wavelengths may be re-multiplexed (e.g., optical multiplexer/combiner 134) and passed to the optical phase modulator 112.

In embodiments, the receiver element 118 may receive an RF echo signal 136 based on the reflection of the transmitted outbound RF signal 130 by a target 138. The RF echo signal 136 may be delayed by the time $\Delta_T$ associated with its round trip from the transmitter element 116 and (after reflection by the target 138) to the receiver element 118. Accordingly, the input frequency fire of the RF echo signal 136 at the optical phase modulator 112 (wherein the time-delayed WDM photonic input is modulated, driven by the RF echo signal) may be $f_{IN}=f_{OUT}+4k\Delta_T=4f_{IF}+4k\Delta_T=4(f_0+kt+k\Delta_T)$.

In embodiments, the modulated WDM photonic input 140 may be demultiplexed (e.g., via wavelength selective optical multiplexer 142) into an array of N physical channels 120 corresponding to the N component wavelengths. For each physical channel 120a ... 120n, an array of bandpass optical filters 144 extract two adjacent frequencies: a time-delayed phase modulator carrier $f_L$ having a frequency (allowing for a two-way time delay $2kD_i$):

$$f_c(i)-2(f_0+k(t+D_i))=f_c(i)-2(f_0+k(t+D_i))=f_c(i)-2f_0-2kt-2kD_i$$

and a sideband having a frequency:

$$f_L+f_{IN}=f_c(i)-2-2(f_0+kt)+4(f_0+kt+k\Delta_T)=f_c(i)+2(f_0+kt)+4k\Delta_T=f_c(i)+2f_0+2kt+4k\Delta_T.$$

which frequency approximates that of $f_U$ (again allowing for the time delay $2kD_i$), or $f_c(i)+2$ $(f_0+k(t+D_i))=+f_c(i)+2f_0+2kt+2kD_i$.

In embodiments, an array of photodetectors 146 in each physical channel 120a-n performs optical/electrical conversion of the two extracted signals $f_L$ and $f_L+f_{IN}$, generating an electrical signal of frequency $\Delta f_i=4k(\Delta_T-D_i)$. A final array of low-pass electrical filters 148 (e.g., RF filters) provides that the electrical signal from only one of the N physical channels 120a-n passes through the WDM-based photonic radar 100 to signal processors 150 (e.g., digital signal processors, analog-digital converters) by passing only the electrical signal having a time delay $D_i$ closest to the time delay $\Delta_T$ from the transmission of the outbound RF signal 130 to the reception of the RF echo signal 136, reducing the receiver filter bandwidth requirement by a factor of N (e.g., from $4k\Delta_T$ to $4k\Delta_T/N$).

Figure 2:
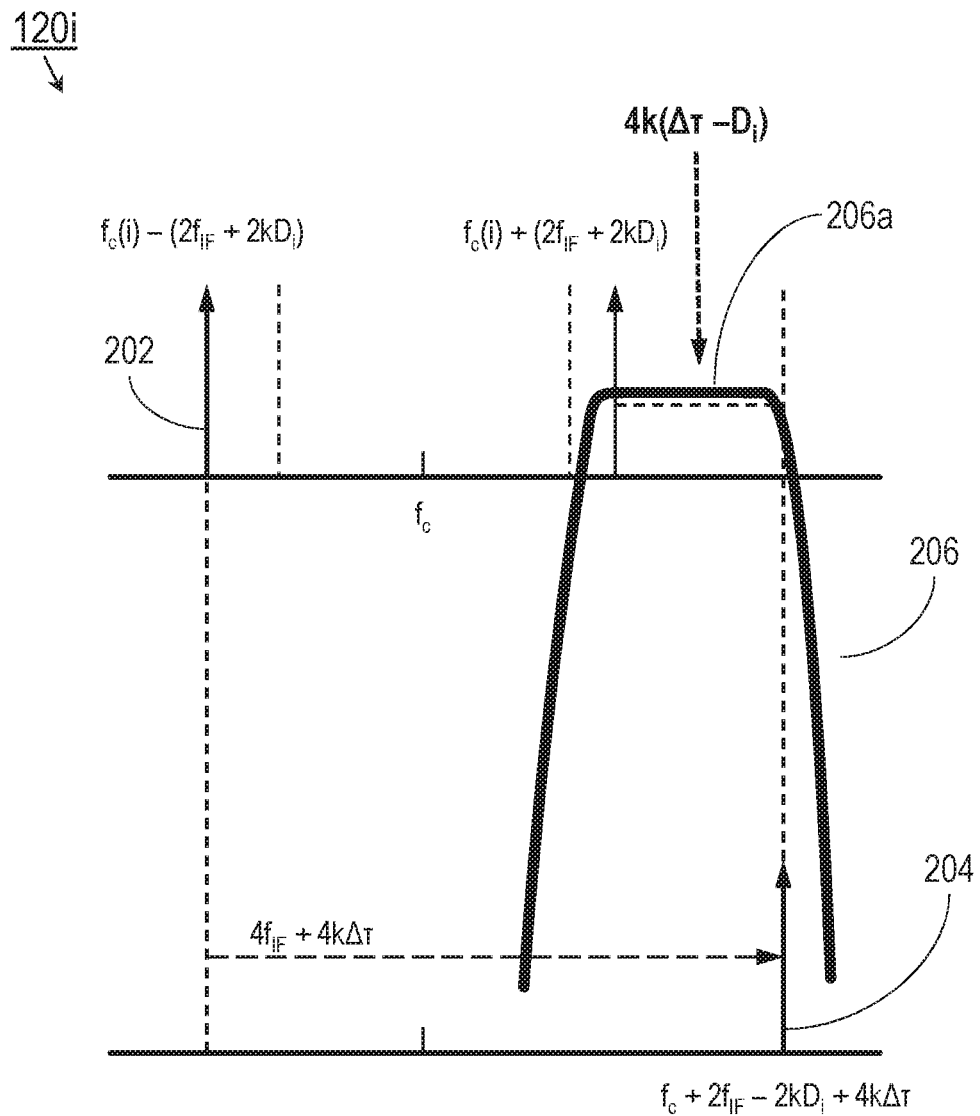
FIG. 2 is a diagrammatic illustration of signal processing operations of the WDM-based photonic radar of FIG. 1.

Referring to FIG. 2, a physical channel 120i of the WDM-based photonic radar 100 of FIG. 1 is disclosed. In embodiments, the array of optical filters (144, FIG. 1) may extract from the photonic content of each physical channel (120a-n, FIG. 1) two signals 202, 204 having substantially adjacent frequencies, as noted above. For example, the extracted signal 202 may have a frequency $f_c(i)-(2f_{IF}+2kD_i)$ and the extracted signal 204 a frequency $f_L+f_{IN}=+2f_{IF}-2kD_i+4k\Delta_T$. The array of photodetectors (146, FIG. 1) may convert the extracted signals 202, 204 into the electrical signal 206 having frequency $\Delta f_i=4k(\Delta_T-D_i)$.

In embodiments, the array of electrical filters (148, FIG. 1) may pass to the signal processors (150, FIG. 1) the electrical signal 206 of the physical channel 120i, where the electrical signal 206 (of all N physical channels 120a-n) has a time delay $D_i$ closest to $\Delta_T$, and thus the narrowest possible frequency peak (206a). The signal processors 150 may determine the spectrum information of the electrical signal 206 and derive a distance between the WDM-based photonic radar 100 and the target 138 based on the frequency peak 206a.

In embodiments, compared to a single-channel photonic radar, the electrical filters 148 may reduce the maximum bandwidth of the WDM-based photonic radar 100 by a factor of N. For a single-channel implementation, the target (138, FIG. 1) at a longer distance would result in a larger time delay $\Delta_T$, and thus greater bandwidth requirements (e.g., $\Delta f_i=4k\Delta_T$). With respect to the WDM-based photonic radar 100, however, a target 138 at the same distance may be associated with a time delay $D_i=\Delta_T(i-1)/N$ [i=1, 2, . . . N] and a required bandwidth of $4k\Delta_T/N$. Accordingly, given the same speed and bandwidth, the potential range of the WDM-based photonic radar 100 may be extended by a factor of N as opposed to the single-channel implementation.

Figure 3A:
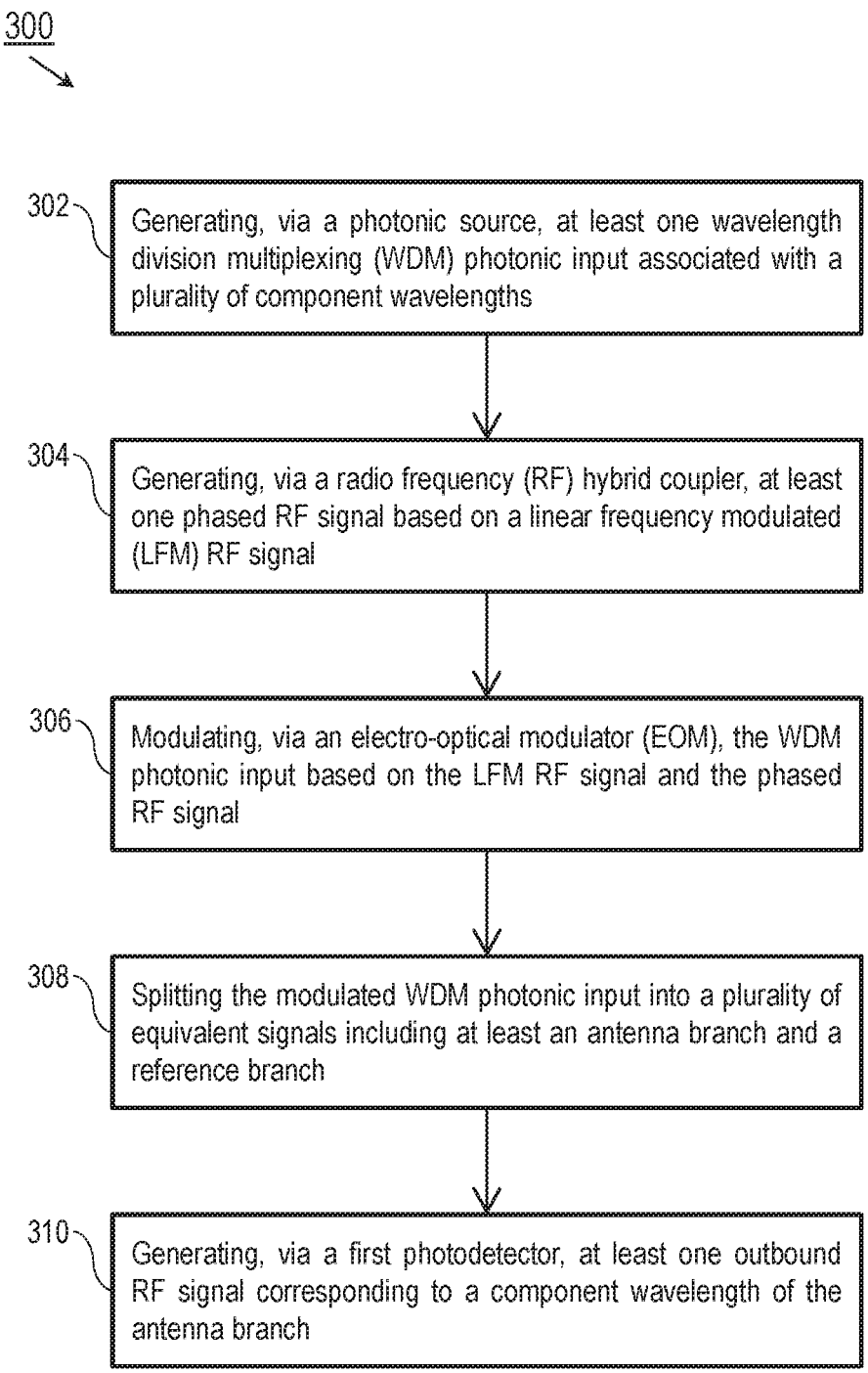
Figure 3C:
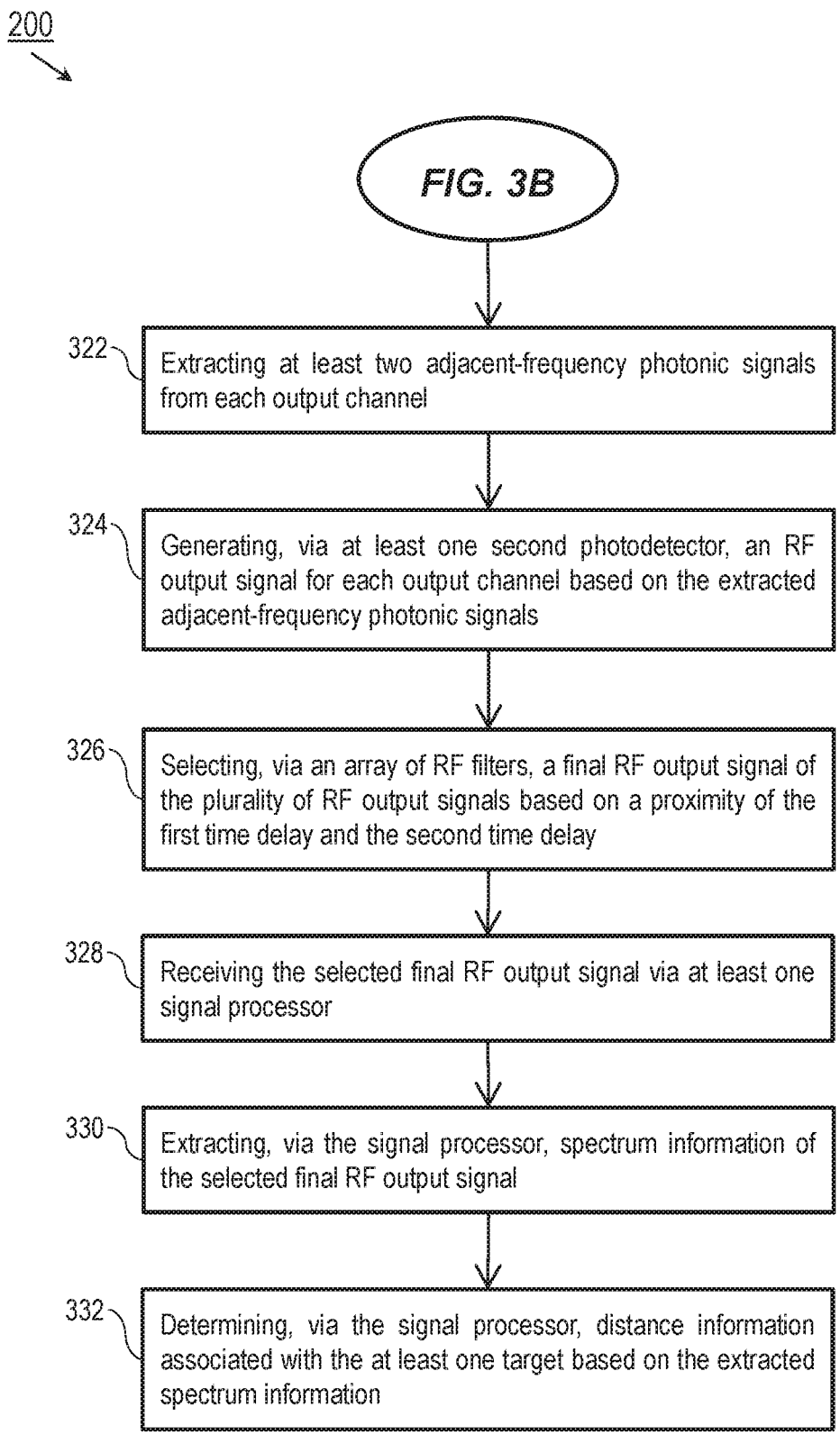

Referring to FIGS. 3A through 3C, the method 300 may be implemented by embodiments of the WDM-based photonic radar 100 and may include the following steps.

Referring in particular to FIG. 3A, at a step 302, a photonic source generates a wavelength division multiplexing (WDM) photonic input associated with a set of N component wavelengths. For example, the WDM photonic input may comprise a set of N wavelength-specific inputs optically combined or multiplexed into the WDM photonic input.

At a step 304, a radio frequency (RF) hybrid coupler receives an intermediate frequency (IF) linear frequency modulated (LFM) input signal and outputs the IF-LFM signal as well as a 90-degree phased version of the IF-LFM input signal.

At a step 306, a dual-parallel electro-optical modulator (DP-EOM) modulates the WDM photonic input based on the IF-LFM signal and its 90-degree phased counterpart signal. For example, the DP-EOM may be a dual-parallel Mach-Zehnder modulator (MZM).

At a step 308, the modulated WDM photonic signal is optically split into two equivalent signals, an antenna branch and a reference branch.

At a step 310, a photodetector receives the antenna branch and generates an outbound RF signal corresponding to a component wavelength (of the N component wavelengths) of the antenna branch.

Referring in particular to FIG. 3B, at a step 312, an antenna element transmits the outbound RF signal.

At a step 314, the antenna element receives a reflected RF echo signal (e.g., a reflection of the outbound RF signal by a target); a primary time delay associated with the reflection represents the time between the transmission of the outbound RF signal and the reception of the RF echo signal.

At a step 316, an array of optical delay lines time-adjusts each of the N component wavelengths of the reference branch (e.g., after the reference branch is demultiplexed into its component wavelengths) according to an array of N secondary time delays.

Ata step 318, the time-adjusted reference branch (e.g., after re-multiplexing of the N time-adjusted component wavelengths) is modulated by an optical phase modulator driven by the received RF echo signal.

At a step 320, the modulated time-adjusted reference branch is demultiplexed into N component physical channels, each physical channel corresponding to a component wavelength.

Referring in particular to FIG. 3C, at a step 322, optical filters in the physical channels extract two adjacent-frequency photonic signals from each time-adjusted component wavelength of the reference branch.

At a step 324, photodetectors generate an RF output signal in each output channel based on the two extracted adjacent-frequency photonic signals. For example, the photodetectors of each physical channel may operate in parallel.

At a step 326, an array of RF/electrical filters (e.g., one or more filters per each physical channel) collectively select one final RF output signal to pass through the WDM photonic radar architecture by passing the final RF output signal based on the proximity of the primary and secondary time delays (and attenuating the remaining N−1 RF output signals). Similarly to the photodetectors, the RF/electrical filters of each physical channel may operate in parallel.

The method 300 may additionally include the steps 328 through 332. At the step 328, signal processors receive the selected final RF output signal.

At a step 330, the signal processors extract spectrum information of the selected final RF output signal.

At the step 332, the signal processor determines distance information of the reflecting target (e.g., distance from the WDM-based photonic radar architecture) based on the extracted spectrum information.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A wavelength division multiplexing (WDM) based photonic radar assembly, comprising:
   at least one photonic source configured to generate a photonic wavelength division multiplexing (WDM) input corresponding to a plurality of component wavelengths;
   at least one radio frequency (RF) hybrid coupler configured to receive a linear frequency modulated (LFM) signal and output the LFM signal and a phased LFM signal based on the LFM signal;
   at least one electro-optical modulator (EOM) optically coupled to the photonic signal source and electrically coupled to the RF hybrid coupler, the EOM configured to modulate the photonic WDM input according to the LFM signal and the phased LFM signal;
   an optical splitter optically coupled to the EOM and configured to split the modulated photonic WDM input into an antenna branch and a reference branch;
   at least one first optical filter optically coupled to the optical splitter, the first optical filter configured to select a component wavelength of the antenna branch;
   at least one first photodetector optically coupled to the first optical filter, the first photodetector configured to generate an outbound RF signal based on the selected component wavelength;
   at least one RF antenna electrically coupled to the photodetector and comprising:
      at least one transmitter element configured to transmit the outbound RF signal;
      and
      at least one receiver element configured to receive an RF echo signal associated with the outbound RF signal, the RF echo signal reflected by at least one target and associated with a first time delay corresponding to the reflection;
   a reference arm optically coupled to the optical splitter and configured to time-adjust each component wavelength of the reference branch according to an array of wavelength selective second time delays;
   at least one optical phase modulator optically coupled to the reference arm and electrically coupled to the RF antenna, the optical phase modulator configured to modulate the time-adjusted reference branch according to the RF echo signal;
   at least one demultiplexer optically coupled to the phase modulator and configured to demultiplex the modulated time-adjusted reference branch into an array of output channels, each output channel corresponding to a component wavelength and comprising:
      at least one second optical filter optically coupled to the demultiplexer and configured to extract at least two adjacent photonic signals from the component wavelength;
      a second photodetector optically coupled to the second optical filter and configured to generate at least one RF output signal based on a frequency difference of the at least two adjacent photonic signals;
      and
      at least one RF filter electrically coupled to the second photodetector, the RF filter configured to pass the at least one RF output signal based on a proximity of the first time delay and the second time delay.

2. The WDM-based photonic radar assembly of claim 1, wherein:
   the first time delay is based on a difference between a transmission time of the outbound RF signal and a reception time of the RF echo signal;
   each output channel is associated with the wavelength selective second time delay corresponding to its component wavelength;
   and
   the at least one RF filter of each output channel is collectively configured to select for processing the output channel associated with the second time delay closest to the first time delay.

3. The WDM-based photonic radar assembly of claim 1, further comprising:
   at least one signal processor coupled to the array of output channels, the signal processor configured to:
      receive the selected RF output signal;
      extract spectrum information of the selected RF output signal;
      and
      determine, based on the extracted spectrum information, distance information associated with the at least one target.

4. The WDM-based photonic radar assembly of claim 3, wherein the at least one signal processor is configured to process the array of output channels in parallel.

5. The WDM-based photonic radar assembly of claim 1, wherein the photonic source comprises:
   at least one laser source configured to generate a plurality of photonic inputs corresponding to the plurality of component wavelengths;
   and
   at least one optical combiner configured to multiplex the plurality of photonic inputs into the photonic WDM input.

6. The WDM-based photonic radar assembly of claim 1, wherein the at least one EOM includes at least one Mach-Zehnder modulator (MZM).

7. A method for wavelength division multiplexing (WDM) based photonic radar ranging, comprising:
   generating, via a photonic source, at least one wavelength division multiplexing (WDM) photonic input associated with a plurality of component wavelengths;
   generating, via a radio frequency (RF) hybrid coupler, at least one phased RF signal based on a linear frequency modulated (LFM) RF signal;
   modulating, via an electro-optical modulator (EOM), the WDM photonic input based on the LFM RF signal and the phased RF signal;
   splitting the modulated WDM photonic input into a plurality of equivalent signals including at least an antenna branch and a reference branch;
   generating, via a first photodetector, at least one outbound RF signal corresponding to a component wavelength of the antenna branch;
   transmitting the outbound RF signal via at least one antenna element;

receiving, via the antenna element, at least one RF echo signal corresponding to the transmitted outbound RF signal and reflected by at least one target, the RF echo signal associated with a first time delay corresponding to the reflection;

time-adjusting each component wavelength of the reference branch according to an array of second time delays corresponding to the plurality of component wavelengths;

modulating, via an optical phase modulator, the time-adjusted reference branch based on the received RF echo signal;

demultiplexing the modulated time-adjusted reference branch into a plurality of wavelength-selective output channels;

extracting at least two adjacent-frequency photonic signals from each output channel;

generating, via at least one second photodetector, an RF output signal for each output channel based on the extracted adjacent-frequency photonic signals; and selecting, via an array of RF filters, a final RF output signal of the plurality of RF output signals based on a proximity of the first time delay and the second time delay.

8. The method of claim 7, wherein generating, via a photonic source, at least one wavelength division multiplexing (WDM) photonic input associated with a plurality of component wavelengths includes:

generating, via at least one laser source, a plurality of photonic inputs, each photonic input corresponding to a component wavelength of the plurality of component wavelengths;

and multiplexing the plurality of photonic inputs into the WDM photonic signal.

9. The method of claim 7, wherein receiving, via the antenna element, at least one RF echo signal corresponding to the transmitted outbound RF signal and reflected by at least one target, the RF echo signal associated with a first time delay corresponding to the reflection includes:

receiving, via the antenna element, at least one RF echo signal associated with a first time delay $\Delta_T$ based on a difference between a transmission time of the outbound RF signal and a reception time of the RF echo signal.

10. The method of claim 9, wherein selecting, via an array of RF filters, a final RF output signal of the plurality of RF output signals includes:

selecting, via an array of RF filters, the RF output signal from the output channel associated with the second time delay closest to the first time delay.

11. The method of claim 7, wherein extracting at least two adjacent-frequency photonic signals from each output channel includes:

extracting the at least two adjacent-frequency photonic signals from each output channel in parallel.

12. The method of claim 11, wherein generating, via at least one second photodetector, an RF output signal for each output channel based on the extracted adjacent-frequency photonic signals includes:

generating the RF output signal for each output channel in parallel.

13. The method of claim 7, further comprising:

receiving the selected final RF output signal via at least one signal processor;

extracting, via the signal processor, spectrum information of the selected final RF output signal;

and determining, via the signal processor, distance information associated with the at least one target based on the extracted spectrum information.

* * * * *